(12) United States Patent
Reichenbecher et al.

(10) Patent No.: US 10,850,700 B2
(45) Date of Patent: Dec. 1, 2020

(54) METHOD FOR MANUFACTURING A GAS BAG MODULE OF A VEHICLE OCCUPANT RESTRAINT SYSTEM, AND GAS BAG MODULE

(71) Applicant: TAKATA AG, Aschaffenburg (DE)

(72) Inventors: Thomas Reichenbecher, Ulm (DE); Axel Grüner, Langenau (DE); Karl-Heinz Bührlen, Ulm (DE)

(73) Assignee: JOYSON SAFETY SYSTEMS GERMANY GMBH, Aschaffenburg (DE)

( * ) Notice: Subject to any disclaimer, the term of this patent is extended or adjusted under 35 U.S.C. 154(b) by 271 days.

(21) Appl. No.: 15/908,204

(22) Filed: Feb. 28, 2018

(65) Prior Publication Data

US 2018/0257601 A1  Sep. 13, 2018

(30) Foreign Application Priority Data

Mar. 9, 2017 (DE) .................. 10 2017 203 931

(51) Int. Cl.
*B60R 21/237* (2006.01)
*B60R 21/217* (2011.01)

(52) U.S. Cl.
CPC .......... *B60R 21/237* (2013.01); *B60R 21/217* (2013.01); *B60R 2021/2375* (2013.01)

(58) Field of Classification Search
CPC ........................... B60R 21/237; B60R 21/2375
See application file for complete search history.

(56) References Cited

U.S. PATENT DOCUMENTS

| 5,022,676 | A | * | 6/1991 | Rogerson | B60R 21/237 280/728.2 |
| 5,360,387 | A | * | 11/1994 | Baker | B60R 21/237 280/243 |
| 5,493,846 | A | * | 2/1996 | Baker | B60R 21/237 280/743.1 |
| RE35,265 | E | * | 6/1996 | Baker | B60R 21/237 280/743.1 |
| 6,110,094 | A | * | 8/2000 | Wallentin | B60R 21/237 280/728.1 |
| 6,115,998 | A | | 9/2000 | Reh et al. | |
| 6,422,588 | B2 | * | 7/2002 | Hieber | B60R 21/237 280/728.1 |
| 6,432,033 | B1 | * | 8/2002 | Salzmann | B60R 21/237 280/728.1 |
| 6,588,793 | B2 | * | 7/2003 | Rose | B60R 21/2171 280/728.2 |

(Continued)

FOREIGN PATENT DOCUMENTS

| DE | 195 35 564 C2 | 5/2000 |
| DE | 10 2006 055 037 A1 | 6/2008 |

(Continued)

*Primary Examiner* — Nicole T Verley
(74) *Attorney, Agent, or Firm* — Gordon Rees Scully Mansukhani, LLP

(57) ABSTRACT

It is provided a method for manufacturing a gas bag module of a vehicle occupant restraint system. The method comprising the steps: providing a gas bag; prefolding the gas bag; pressing at least a portion of the prefolded gas bag under the influence of heat; and folding the pressed gas bag to a final dimension.

11 Claims, 2 Drawing Sheets

(56) References Cited

U.S. PATENT DOCUMENTS

| | | | | |
|---|---|---|---|---|
| 6,607,210 | B2* | 8/2003 | Eckert | B60R 21/233 |
| | | | | 280/732 |
| 7,163,232 | B2* | 1/2007 | Yokoyama | B60R 21/201 |
| | | | | 280/730.2 |
| 8,806,773 | B2* | 8/2014 | Nebel | B60R 21/237 |
| | | | | 34/357 |
| 9,333,933 | B2 | 5/2016 | Kunkel et al. | |
| 9,994,187 | B2* | 6/2018 | Okuhara | B60R 21/232 |
| 10,239,482 | B2* | 3/2019 | Hepp | B60R 21/237 |
| 2012/0267880 | A1 | 10/2012 | Frisk et al. | |
| 2018/0229685 | A1* | 8/2018 | Song | B60R 21/237 |
| 2018/0236965 | A1* | 8/2018 | Fischer | B60R 21/237 |

FOREIGN PATENT DOCUMENTS

| | | | | |
|---|---|---|---|---|
| DE | 10 2009 059 702 A1 | 6/2011 | | |
| DE | 10 2010 049 774 A1 | 5/2012 | | |
| DE | 10 2014 017 531 A1 | 6/2015 | | |
| EP | 1 127 752 B1 | 10/2004 | | |
| EP | 2 454 128 B1 | 12/2016 | | |
| JP | 11-240402 | 9/1999 | | |
| JP | 2015-105036 | 6/2015 | | |
| WO | WO-2008069704 A1 * | 6/2008 | | B60R 21/237 |
| WO | WO 2012/055491 A1 | 5/2012 | | |
| WO | WO-2019076666 A1 * | 4/2019 | | B60R 21/237 |

\* cited by examiner

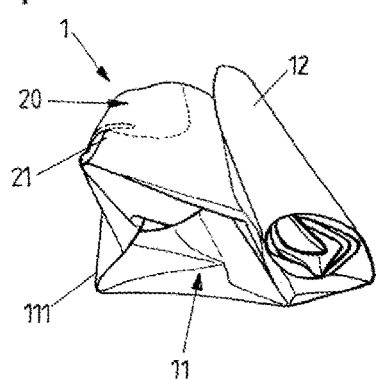
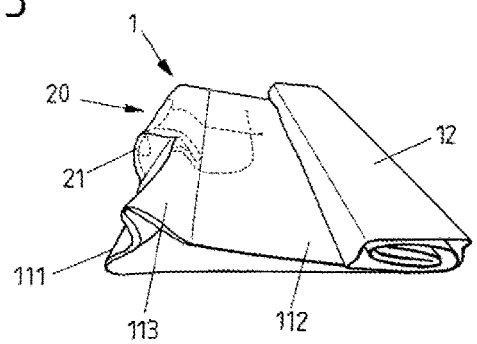
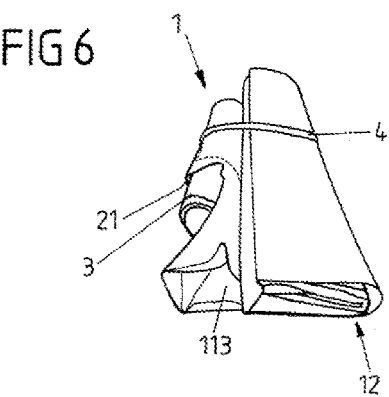

METHOD FOR MANUFACTURING A GAS BAG MODULE OF A VEHICLE OCCUPANT RESTRAINT SYSTEM, AND GAS BAG MODULE

REFERENCE TO RELATED APPLICATION

This application claims priority to German Patent Application No. 10 2017 203 931.0 filed on Mar. 9, 2017, the entirety of which is incorporated by reference herein.

BACKGROUND

The invention relates to a method for manufacturing a gas bag module of a vehicle occupant restraint system and to a gas bag module.

Gas bags of a gas bag module usually are folded before their assembly in the gas bag module or in the vehicle. To fix the gas bags in the folded form, they can be provided with fixing elements (e.g. fixing straps). Moreover, it is known e.g. from EP 2 454 128 A1 to stabilize the gas bag convolution by pressing the gas bag under the influence of heat and moisture. Such pressing of the gas bag, however, can have a negative influence on the handleability of the gas bag.

SUMMARY

The problem to be solved by the invention consists in compacting a gas bag into a shape as stable as possible without possibly impairing its handleability.

This problem is solved by providing the method with features as described herein and the gas bag module with features as described herein.

Accordingly, there is provided a method for manufacturing a gas bag module of a vehicle occupant restraint system, comprising:

providing a gas bag;
prefolding the gas bag;
pressing at least a portion of the prefolded gas bag under the influence of heat; and
folding the pressed gas bag to a final dimension.

Thus, the gas bag is not pressed to the final dimension, but only is brought to the final dimension by a final folding operation after pressing. Pressing of the prefolded gas bag can be carried out in addition under the influence of moisture, wherein the gas bag is moistened (e.g. by the action of steam onto the gas bag) e.g. before pressing and/or during pressing. The final folding operation after pressing, however, is effected without pressing the gas bag and in particular also without the influence of heat or moisture.

After the pressing operation, the gas bag correspondingly does not yet have the desired final dimension. The "final dimension" in particular is the specified dimension required for the assembly in the gas bag module (such as in a housing of the gas bag module) or in the vehicle. With the method according to the invention it is possible, for example, to fold a functional portion of the gas bag, e.g. a portion which serves to accommodate a gas generator, only after pressing the gas bag into the desired position. It is also possible that pressing is carried out such that the final folding operation is simplified; for example, by means of pressing at least one folding line is predefined for the final convolution.

For example, the prefolded gas bag includes at least one first and one second portion, wherein the first portion is unfolded or has a convolution other than the second portion. It is conceivable that the first portion is folded over along only few (e.g. not more than three) folding lines, in particular along a single folding line, and/or the second portion is roll-folded and/or zigzag-folded. It is also conceivable, however, that the second portion has another convolution, e.g. an unordered convolution.

It is possible in addition that pressing of the prefolded gas bag comprises pressing of the second portion (in particular at least substantially of the entire second portion), while the first portion is pressed only partly or not at all. It is also possible, however, that both the entire first portion and the entire second portion are pressed. In particular, pressing of the entire prefolded gas bag is effected. The first and the second portion in particular adjoin each other, wherein e.g. before pressing they lie one beside the other.

According to a development of the invention, the first and the second portion of the prefolded gas bag are at least partly folded onto each other after the pressing operation. In particular, the first portion is folded over onto the second portion after pressing the gas bag, i.e. is folded onto the second portion along a fold.

According to another aspect of the invention the first portion of the prefolded gas bag is formed to accommodate a gas generator. For example, the first portion therefor includes a receiving region which comprises an introduction opening through which the gas generator can be introduced into the gas bag. It is also conceivable that the receiving region forms a fastening opening through which a fastening element (e.g. a fastening bolt) of the gas generator can be led through. It is conceivable in particular that the receiving region is not pressed in order to simplify the assembly of the gas generator in the receiving region.

According to another embodiment of the invention, after the pressing a gas generator is introduced into an introduction opening and thereafter the gas bag is folded into its final dimension by folding the first and the second portion of the gas bag at least partly onto each other.

According to another development of the method of the invention, the gas bag folded to the final dimension is provided with at least one fixing element in order to counteract folding apart of the gas bag. For example, the fixing element is a fixing strap (e.g. in the form of a tape).

It is also possible that the gas bag folded to the final dimension is arranged in a housing. For example, the housing is a softcover or a hardcover (for example in the form of a metal or plastic housing). It is also conceivable, however, that the gas bag folded to the final dimension is arranged directly in the vehicle (and covered e.g. with a trim of the vehicle interior).

The invention also relates to a gas bag module for a vehicle occupant restraint system, which in particular is manufactured by the method described above, comprising a folded gas bag which includes a portion pressed under the influence of heat and an unpressed portion.

The aspects of the method of the invention described above in connection can of course also be realized analogously in the gas bag module of the invention. For example, a gas generator for inflating the gas bag can be arranged in the unpressed portion.

BRIEF DESCRIPTION OF THE DRAWINGS

The invention will be explained in detail below with reference to exemplary embodiments.

FIGS. 4 to 6 show the gas bag of FIGS. 1 to 3 in a perspective view.

DETAILED DESCRIPTION

Figure 1:
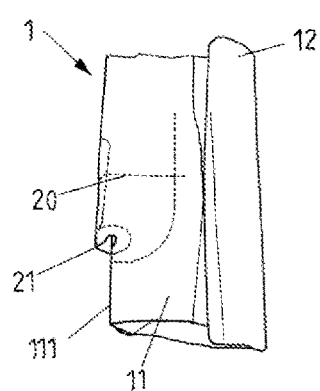
FIGS. 1 to 3 show views of a gas bag from above at different times during the execution of the method according to the invention.

FIG. 1 (FIG. 4) shows a gas bag 1 in a prefolded condition. In this prefolded condition the gas bag 1 comprises a first and a second portion 11, 12, wherein the first portion 11 merely is folded over once (i.e. merely includes a single fold 111), while the second portion 12 is roll-folded. It is also conceivable that the first portion 11 includes more than one fold, or also that the first portion 11 is not folded at all. In addition, the second portion 12 might also include a zigzag fold or a combination of a roll fold and a zigzag fold.

The first portion 11 of the prefolded gas bag 1 furthermore comprises a receiving region 20 for accommodating a gas generator. The receiving region 20 has an introduction opening 21 into which the gas generator can be introduced (cf. FIG. 3 and FIG. 6). In the receiving region 20 there can also be provided fastening openings for fastening the gas generator, which for example serve to lead through fastening bolts of the gas generator.

Figure 2:
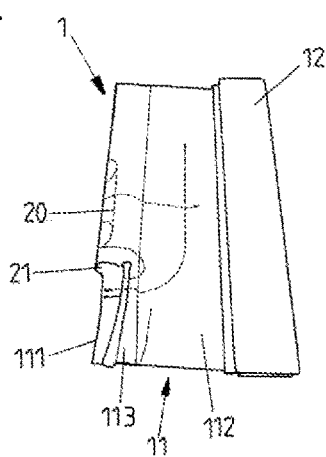

The prefolded gas bag 1 is pressed under the influence of heat and moisture, namely such that pressing of the complete second portion 12, but only of a section 112 of the first portion 11 adjoining the second portion 12 is effected. Another section 113 of the first portion 11, in which the introduction opening 21 is formed, is not pressed however (cf. FIG. 2 and FIG. 5) in order to facilitate the arrangement of the gas generator in the receiving portion 20. Pressing of the gas bag 1 is effected substantially vertically to the main plane of extension of the prefolded gas bag, wherein in particular a correspondingly configured pressing device (not shown) is used.

Figure 3:
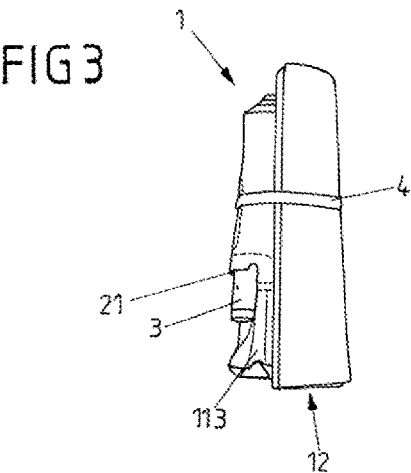

After the pressing operation a gas generator 3 is introduced into the introduction opening 21 and the gas bag 1 is folded into its final dimension by the section 112 of the first portion 11 and the second portion 12 of the gas bag 1 being folded onto each other; for example along a folding line adjoining the roll-folded second portion 12. Thus, the entire second section 112 of the first portion 11 substantially comes to abut against the roll-folded portion 12, wherein the first section 113 with the gas generator 3 laterally adjoins the roll-folded portion 12. This condition of the gas bag 1 folded to the final dimension is shown in FIG. 3 (FIG. 6).

After being folded to its final dimension, the gas bag 1 can be provided with a fixing element in the form of a fixing strap 4 in order to fix the convolution of the gas bag 1.

It should be noted that the invention is of course not limited to a particular kind of prefolding. Pressing of the gas bag in principle can be effected at any time of the folding process, i.e. with a gas bag present in basically any prefolding condition. It is also quite conceivable that the entire prefolded gas bag 1 (including the section 113) is pressed. In any case, however, the gas bag 1 only is brought to the final dimension by a folding operation carried out after pressing.

The invention claimed is:

1. A method for manufacturing a gas bag module of a vehicle occupant restraint system, comprising:
   providing a gas bag;
   prefolding the gas bag in such a way that the prefolded gas bag includes at least one first portion and one second portion, wherein the first portion is unfolded or has a convolution other than the second portion and forms a receiving region having an introduction opening into which a gas generator can be introduced;
   pressing at least the second portion of the prefolded gas bag under the influence of heat, wherein the receiving region is not pressed; and
   folding the pressed gas bag to a final dimension;
   wherein after the pressing, the gas generator is introduced into the introduction opening and thereafter the gas bag is folded to the final dimension by folding the first portion and the second portion at least partly onto each other.

2. The method according to claim 1, wherein prefolding of the gas bag comprises roll-folding of a portion of the gas bag.

3. The method according to claim 1, wherein the second portion is roll-folded and/or zigzag-folded.

4. The method according to claim 1, wherein pressing of the prefolded gas bag comprises pressing of the second portion, while the first portion is pressed only partly or not at all.

5. The method according to claim 1, wherein pressing of the prefolded gas bag comprises pressing of the entire prefolded gas bag.

6. The method according to claim 1, wherein the first portion includes at least one fastening opening for fastening the gas generator.

7. The method according to claim 1, wherein the gas bag folded to the final dimension is provided with at least one fixing element which counteracts folding apart of the gas bag.

8. The method according to claim 7, wherein the fixing element is a fixing strap.

9. The method according to claim 1, wherein the gas bag folded to the final dimension is arranged in a housing.

10. The method according to claim 9, wherein the housing is a softcover or a hardcover.

11. The method according to claim 1, wherein pressing of the portion of the prefolded gas bag is effected under the influence of moisture.

* * * * *